(12) United States Patent
Roscoe

(10) Patent No.: US 6,873,923 B1
(45) Date of Patent: Mar. 29, 2005

(54) SYSTEMS AND METHODS FOR PERFORMING ANALYSIS OF A MULTI-TONE SIGNAL

(75) Inventor: Andrew J. Roscoe, Shrewsbury (GB)

(73) Assignee: Agilent Technologies, Inc., Palo Alto, CA (US)

( * ) Notice: Subject to any disclaimer, the term of this patent is extended or adjusted under 35 U.S.C. 154(b) by 40 days.

(21) Appl. No.: 10/666,327

(22) Filed: Sep. 18, 2003

(51) Int. Cl.[7] .......................... G01R 23/00; G06F 19/00
(52) U.S. Cl. ........................ 702/75; 702/74; 702/189
(58) Field of Search ............................. 702/66, 67, 68, 702/69, 73, 74, 75, 76, 77, 189, 196; 324/620, 624, 76.19

(56) References Cited

U.S. PATENT DOCUMENTS 5,475,315 A * 12/1995 Cabot .......................... 324/628
5,649,304 A *  7/1997 Cabot ....................... 455/67.14

FOREIGN PATENT DOCUMENTS

DE        10131251 A1 *  1/2003

OTHER PUBLICATIONS

Press, William H. et al, "Numerical Recipes in C The Art of Scientific Computing", Cambridge University Press, 1988, pp. 2 cover pages and 408–412.

* cited by examiner

Primary Examiner—Bryan Bui

(57) ABSTRACT

Representative embodiments are directed to systems and methods for processing analyzer trace data of a multi-tone signal to more accurately estimate the frequencies and amplitudes of the tones of the multi-tone signal. Specifically, trace data may be processed to determine peak trace points. For each identified peak point, an error minimization algorithm minimizes the sum of differences between a plurality of trace points surrounding the respective peak point and the predicted Fourier transform through a raised-cosine window of a theoretical tone. The result of the minimization algorithm identifies the amplitude and frequency of a tone of the multi-tone signal with appreciable degree of accuracy.

20 Claims, 4 Drawing Sheets

- FIRST, CHECK THAT THE PEAK OF THE THREE POINTS IS THE MIDDLE POINT IF NOT SIMPLY RETURN THE AMPLITUDE AND FREQUENCY OF THE PEAK POINT AND EXIT — 401
- NOW, CALL THE THREE POINTS AMPLITUDES' y1, y2 AND y3. — 402
- THE POINT FREQUENCIES' ARE xc-dx, xc, AND xc+dx. — 403
- EVALUATE THE "CURVINESS"=(y1-2*y2+y3). — 404
- IF "CURVINESS"=0, THEN SIMPLY RETURN THE AMPLITUDE AND FREQUENCY OF THE PEAK POINT AND EXIT, OTHERWISE, CONTINUE. — 405
  EVALUATE THE FOLLOWING EXPRESSIONS:
- k0=y2; — 406
- k1=(y3-y1)*0.5/dx; — 407
- k2=CURVINESS*0.5/(dx*dx); — 408
- MinMaxX=-k1/(2*k2); — 409
- MinMaxY=k0+k1*MinMaxX+k2*MinMaxX*MinMaxX; — 410
- MinMaxY1=k0+k1*(MinMaxX+dx)+k2*(MinMaxX+dx)*(MinMaxX+dx); — 411
- Maximum=(MinMaxY>MinMaxY1 ? 1 : 0); — 412
- MinMaxX=MinMaxX+xc; — 413
- IF MAXIMUM IS NOT 1, THEN A MAXIMUM WAS NOT FOUND, SIMPLY RETURN THE AMPLITUDE AND FREQUENCY OF THE PEAK POINT, — 414
- OTHERWISE, THE NEW VALUES MinMaxX AND MinMaxY ARE RETURNED TO THE SEED VALUES FOR SIGNAL FREQUENCY (Hz) AND AMPLITUDE (dBm). — 415

FIG. 5

$$\frac{\partial \text{Err}}{\partial A} = \sum_{p=1}^{P} S_p \frac{\sin x}{ax} \left[ \frac{a-b}{\left(1 - \frac{\pi^2}{x^2}\right)} + \frac{a}{\left(1 - \frac{x^2}{\pi^2}\right)} \right] \quad \leftarrow 501$$

$$\frac{\partial \text{Err}}{\partial T} = \sum_{p=1}^{P} \frac{S_p A}{T} \left[ \frac{a-b}{a\left(1 - \frac{\pi^2}{x^2}\right)} \left\{ \cos x - \frac{\sin x}{x} - \frac{2\pi^2 \sin x}{x^3 \left(1 - \frac{\pi^2}{x^2}\right)} \right\} + \frac{1}{\left(1 - \frac{x^2}{\pi^2}\right)} \left\{ \cos x - \frac{\sin x}{x} - \frac{2x \sin x}{\pi^2 \left(1 - \frac{x^2}{\pi^2}\right)} \right\} \right] \quad \leftarrow 502$$

$$\frac{\partial \text{Err}}{\partial \omega} = \sum_{p=1}^{P} \frac{S_p A}{\omega_p} \left[ \frac{a-b}{a\left(1 - \frac{\pi^2}{x^2}\right)} \left\{ \cos x - \frac{\sin x}{x} - \frac{2\pi^2 \sin x}{x^3 \left(1 - \frac{\pi^2}{x^2}\right)} \right\} + \frac{1}{\left(1 - \frac{x^2}{\pi^2}\right)} \left\{ \cos x - \frac{\sin x}{x} + \frac{2x \sin x}{\pi^2 \left(1 - \frac{x^2}{\pi^2}\right)} \right\} \right] \quad \leftarrow 503$$

$$\left[ \frac{a-b}{a\left(1 - \frac{\pi^2}{x^2}\right)} \left\{ \cos x - \frac{\sin x}{x} - \frac{2\pi^2 \sin x}{x^3 \left(1 - \frac{\pi^2}{x^2}\right)} \right\} + \frac{1}{\left(1 - \frac{x^2}{\pi^2}\right)} \left\{ \cos x - \frac{\sin x}{x} + \frac{2x \sin x}{\pi^2 \left(1 - \frac{x^2}{\pi^2}\right)} \right\} \right] \frac{-1}{4} \left[ \frac{(a-b)}{a} + 3 \right] \quad \leftarrow 504$$

ize the Agilent
SYSTEMS AND METHODS FOR PERFORMING ANALYSIS OF A MULTI-TONE SIGNAL

TECHNICAL FIELD

The present invention is related to frequency analysis of a signal and, more particularly, to identification of the frequencies and amplitudes of tones in a multi-tone signal.

BACKGROUND

A number of devices are commercially available that analyze signals to facilitate the design, manufacturing, and calibration of electronic and communication devices and systems. Examples of signal analyzers include the Agilent Technologies, Inc.'s 89400 and 89600 series vector signal analyzers (VSA). When analyzing signals on a signal analyzer, the measured signal is typically presented in the form of a trace representing the frequency domain output of a Fourier transform calculated from samples of the measured signal. The trace consists of the individual points in the frequency domain. In general, an odd number of points are used so that the center point will lie exactly at the center frequency of the frequency span.

For simple single-tone measurements, if the exact tone frequency is known and the equipment (the signal generator and the analyzer) is locked to a frequency reference source, the user may place the signal on the analyzer center frequency. By doing so, measuring the amplitude of the single-tone signal is relatively straight-forward, because the amplitude may be observed from the marker or trace amplitude at the exact center frequency point in the frequency domain. When measuring multi-tone signals, however, most of the tones do not lie at the center frequency and, generally, do not lie exactly on the frequency domain points of the analyzer trace. Instead, most of the tones will lie between two respective trace points. Accordingly, a simple marker measurement is unsuitable for measuring multi-tone signals. The measurement of any single-tone that does not lie exactly at the analyzer center frequency and the measurement of tone(s) produced by equipment that is not locked to the same frequency as the analyzer present similar complications.

Moreover, the measurement of the accurate amplitude and frequency of each tone of a multi-tone signal where the exact frequencies of the tones are unknown beforehand is quite complicated. In general, two traditional approaches have been used to address this type of signal analysis. The first approach uses a Flattop Fourier window function during the analyzer sweep. In the second approach, a Hanning or other raised-cosine window function is used.

By employing the Flattop Fourier window function, the frequency domain representation of the multi-tone signal is widened or flattened. Typically, the tone peak of the multi-tone signal will be widened and flattened on the trace such that two or three trace points will be generated around each tone peak of the multi-tone signal being analyzed. The peak trace amplitude in this region may be read or marker-to-peak and read steps may be performed to estimate the amplitude of the actual peak within 0.01 dB of the "correct result." The "correct result" refers to the result that would be obtained if the signal frequency could be placed at exactly one of the analyzer trace points. Also, the accuracy of the measurement is generally independent of the difference in frequency between the tone being measured and the respective two or three trace points adjacent to the tone.

Some frequency information may be gathered from this trace. However, the accuracy of the gathered frequency information is limited by the frequency resolution between the analyzer trace points. The accuracy of the frequency resolution is often less because of the widening effect of the Flattop Fourier window function and the fact that the amplitude of the two or three trace points adjacent to the actual peak typically have magnitudes within approximately 0.01 dB. Moreover, noise effects may also cause the trace point with the peak amplitude to not be the trace point that is closest to the actual peak point. Thus, the Flattop Fourier window causes frequency measurement to be quite difficult. An artificially tight analyzer resolution bandwidth (RBW) may be employed to address the difficulty. However, this may cause the test time to increase and may cause the measurement to become impractical. Another alternative may be employed in which an ordinary RBW is used for most of the trace and a much smaller RBW is used around selected marker positions. However, this requires multiple sweeps. Specifically, at least one sweep is needed to identify the approximate tone frequencies and one sweep is needed for each tone to place the marker near the position of the respective tone to measure its frequency using the smaller RBW.

There is also a performance constraint associated with the use of the Flattop Fourier window function. Specifically, when this window function is used, the number of required analyzer trace points may increase by a factor of 3.82 as compared to the use of a Uniform window function (depending upon the analyzer employed). This factor may dramatically increase the acquisition time of the analyzer. Also, if the signal to be measured has a wide bandwidth and a narrow RBW is desired for signal-to-noise ratio (SNR) reasons, the factor may require the measurement process to be split into multiple subsections of the signal bandwidth to accommodate analyzer limitations.

By employing a Hanning or other raised-cosine window function, the measurement process will execute more quickly, because the number of trace points is only increased by a factor of 1.5 as compared to a Uniform window function. Moreover, the signal peaks exhibited by the analyzer trace are significantly more sharp than exhibited by the Uniform window function. However, amplitude accuracy may be lost. If a tone of the signal being measured lies almost exactly between two analyzer trace points, the peak amplitude value read from one of the trace peaks may deviate by 1.4 dB from the actual amplitude. This deviation is greatest when the RBW is selected to equal the minimum allowed for a given number of trace points. Clearly, this amount of potential deviation is unsuitable if accurate amplitude measurements are necessary for a particular application.

SUMMARY

Representative embodiments are directed to systems and methods for processing analyzer trace data of a multi-tone signal to more accurately estimate the frequencies and amplitudes of the tones of the multi-tone signal. Representative embodiments begin with an identification of peak trace points from trace data generated through a standard Hanning (or other raised-cosine) window. The identified peak points are then subjected to data processing to generate the more accurate estimates of the frequencies and amplitudes of the tones of the multitone signal. Specifically, the identified peak points are used to generate seed values for an error minimization algorithm. The error minimization algorithm minimizes the sum of differences between a plurality of trace points surrounding a tone of the multi-tone signal and the predicted Fourier transform through a raised-cosine window length of "T" seconds of a theoretical tone of amplitude "A" with frequency "F." After the minimization algorithm has minimized the error function, the resulting minimized values of "A" and "F" are used to identify the amplitude and frequency of the respective tone of the multi-tone signal. The minimization algorithm is performed for each tone of the multi-tone signal.

Representative embodiments achieve the most accurate results when processing trace data of continuous wave (CW) or multi-tone CW signals. For multi-tone signals, the tones of the multi-tone signal should be separated by three or more RBW to maintain the accuracy of the algorithm. Additionally, representative embodiments may be used to process the central peaks (or sideband) peaks of amplitude modulated, frequency modulated, or pulse modulated signals that are modulated by CW tones. For these types of signals, there would be a single "CW" tone at the signal center frequency and a number of "CW" sidebands. Likewise, a digital phase shift keyed (PSK), frequency shift keyed (FSK), or quadrature amplitude modulated (QAM) signal modulated by a regularly repeating digital "word" would produce "CW" tones that may be analyzed by representative embodiments.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily used as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DESCRIPTION OF THE DRAWINGS

For a more complete understanding of the present invention, reference is now made to the following descriptions taken in conjunction with the accompanying drawing, in which:

FIG. 4 depicts an algorithm for generating seed values for a minimization algorithm according to representative embodiments; and FIG. 5 depicts partial derivatives for optimizing a minimization algorithm according to representative embodiments.

DETAILED DESCRIPTION

Figure 1:
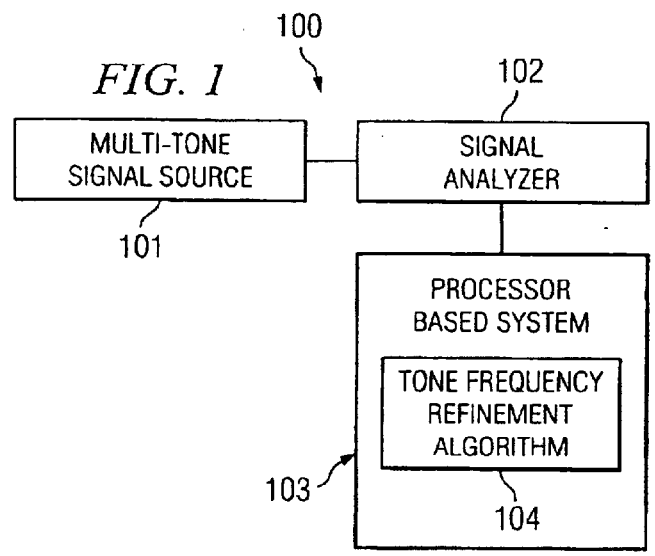
FIG. 1 depicts a system for analyzing a multi-tone signal according to representative embodiments.

Referring now to the drawings, FIG. 1 depicts system 100 for analyzing a multi-tone signal according to representative embodiments. System 100 includes multi-tone signal source 101 and signal analyzer 102. Signal analyzer 102 maybe implemented utilizing any number of commercially available signal analyzers such as Agilent Technologies, Inc.'s 89400 and 89600 series VSAs. Signal analyzer 102 may be communicatively coupled to processor-based system 103 (e.g., a personal computer). Processor based system 103 may comprise executable instructions stored on a suitable computer readable medium to define tone refinement algorithm 104 that is described in greater detail below. By receiving data associated with the trace generated by signal analyzer 102, tone refinement algorithm 104 may process the data to provide accurate amplitudes and frequencies of signal peaks in a multi-tone signal with a relatively low amount of complexity. Although tone refinement algorithm 104 is shown as being implemented on a separate device, the present invention is not so limited. Tone refinement algorithm 104 may be implemented as executable instructions stored on signal analyzer 102 if desired.

Figure 2:
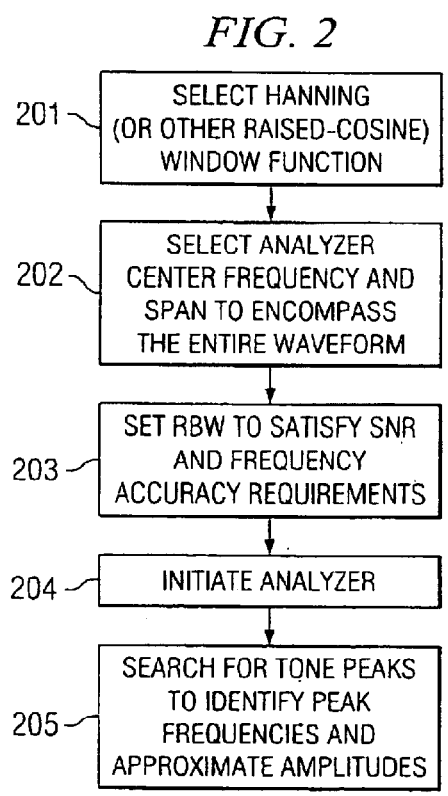
FIG. 2 depicts a flowchart for identifying peak trace points for further processing.

FIG. 2 depicts a flowchart for generating an initial set of analyze trace points to be analyzed. The flowchart of FIG. 2 depicts conventional trace data analysis utilizing a Hanning or other raised-cosine window function to identify signal peaks. In step 201, a Hanning or other raised-cosine window function may be selected on signal analyzer 102. In step 202, the center frequency and frequency span of signal analyzer 102 are set to encompass the entire waveform. In step 203, the RBW is set to satisfy SNR and frequency accuracy constraints. In step 204, frequency analyzer 102 may be initiated using the required number of averages, trigger inputs, and/or the like according to known techniques. In step 205, the trace data generated by signal analyzer 102 may be searched. The search process may use known "marker-to-peak" and "marker-to-lower-peak" functions. Alternatively, the trace data (or portions thereof) may be uploaded to processor based system 103 to search for the peaks. Additional processing may occur to ensure that correct peaks are identified instead of unwanted spurious signals. As previously noted, the search process applied to trace data generated by the Hanning window function identifies the frequencies of the signal peaks with a degree of accuracy. However, amplitude accuracy suffers.

Accordingly, representative embodiments may further process the trace data to obtain substantially more accurate amplitude estimates and more accurate frequency estimates of the tones of the multi-tone signal. For each peak identified according to the process flow of FIG. 2, an iterative error minimization algorithm is employed to estimate the amplitude and frequency of the corresponding tone of the multi-tone signal.

Figure 3:
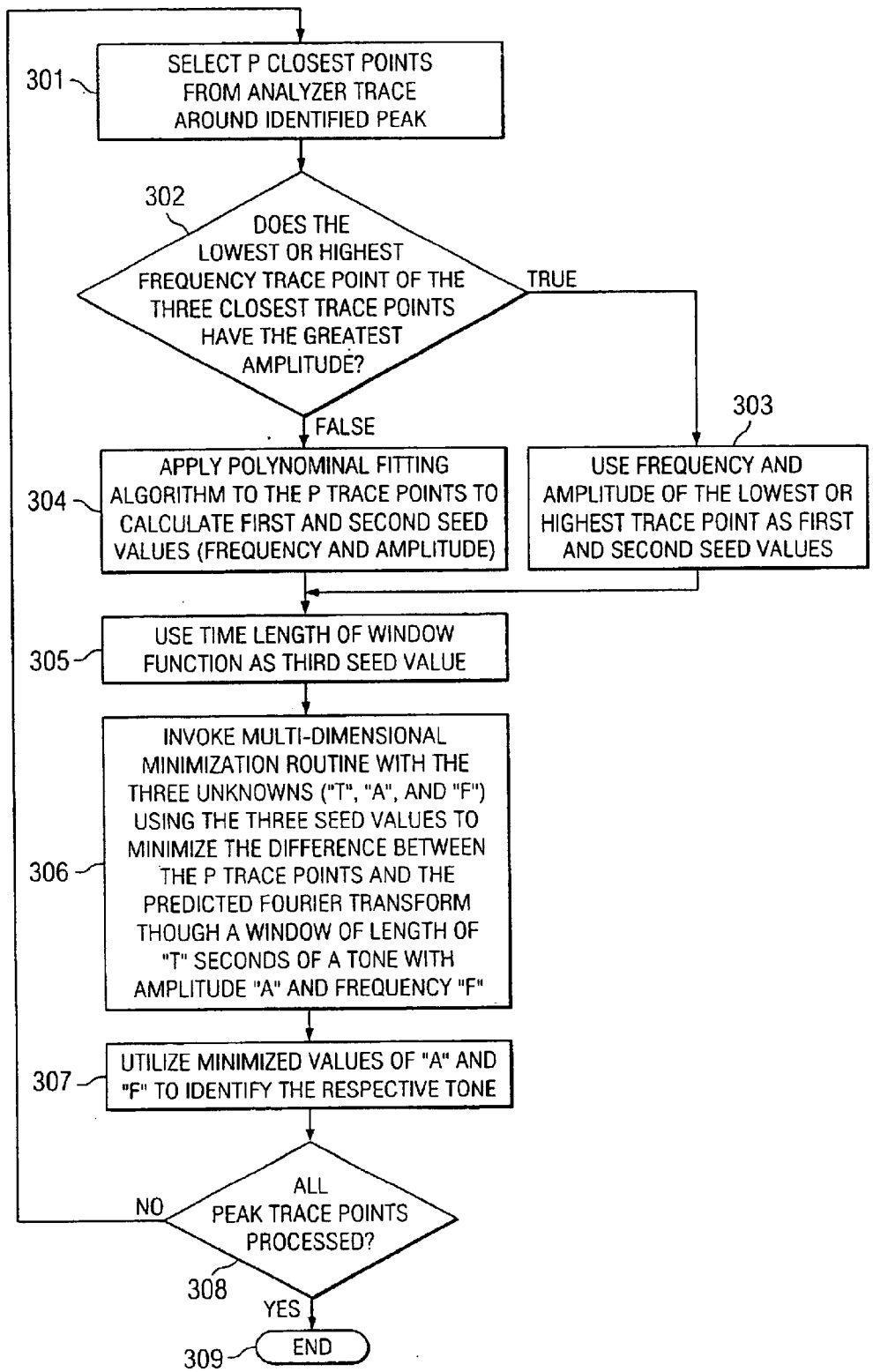
FIG. 3 depicts a flowchart for processing trace points using a minimization algorithm according to representative embodiments.

FIG. 3 depicts a flowchart for performing operations associated with tone refinement algorithm 104 using the trace peak points identified according to the flowchart of FIG. 2. The process flow of the flowchart begins in step 301 where "P" points from the analyzer trace are selected that surround an identified peak. In representative embodiments, the number of selected points equals max([ceil(4/3*RBW/HzPerPoint)*2+1,3]) where HzPerPoint is given by (Analyzer Span/(AnalyzerPoints−1)). The "ceil" operator is a "rounding-up" integer conversion. Alternatively, a fixed number (e.g., five) of points may be used. Additional points may be selected if desired. However, using an appreciably greater number is not advantageous, because the additional points are normally at low amplitudes, affected by noise, or affected by a neighboring signal. Also, an odd number of points may be convenient to simplify implementation of the process flow in executable code. However, an odd number of points is not required.

In step 302, a logical comparison is made. The three points of the "P" selected points that are closest to the tone are examined to determine which of these points possesses the greatest amplitude. If the point with the greatest magnitude has either the lowest or highest frequency of the three closest points, the process flow proceeds from step 302 to step 303. In step 303, the frequency and amplitude of the selected point with the lowest/highest frequency are selected as the first and second seed values. If the point associated with the greatest magnitude is not associated with either the highest or lowest frequency of the three closest points, the process flow proceeds from step 302 to step 304. In step 304, a polynomial fitting algorithm is applied to the three points and the polynomial may be solved against frequency to determine the seed value for the peak frequency. Also, the amplitude of the polynomial at that frequency may be used as the seed amplitude value. The details of the polynomial fitting and solving operations will be discussed in greater detail below.

Both step 303 and step 304 proceed to step 305. In step 305, the third seed value is determined to provide an initial value for the time length of the Hanning or raised-cosine window function. The time length of the window is related to the RBW selected for the analyzer. For example, for Agilent Technologies, Inc.'s 89400 and 89600 series VSAs, the length may be accurately estimated by 1.5/RBW if a Hanning window is used. However, relatively small differences may exist due to analyzer rate quantization and possibly other analyzer algorithms.

After step 305, the three seed values have been determined (i.e., a seed amplitude, a seed frequency, and a seed window length). The seed values may be used to initialize the three variables ("A" which represents the amplitude of a tone, "F" the frequency of the tone, and "T" which represents the length of time of a suitable window function) to begin the operations of an error minimization routine (step 306). The minimization algorithm may be implemented utilizing the Nelder-Mead downhill simplex method or variations thereof. Essentially, the Nelder-Mead downhill simplex method iteratively varies the three variables to minimize an error function. An implementation of the Nelder-Mead downhill simplex method may be found in the book *Numerical Recipes in C++, the Art of Scientific Computing* (ISBN 0-521-75033-4). In representative embodiments, the error function measures the sum of differences between each of the "P" selected trace points and the predicted Fourier transform through a raised-cosine window length of "T" seconds of a theoretical tone of amplitude "A" with frequency "F." Further details regarding the mathematics associated with the Fourier representation of the window function and the error function are provided below.

When the minimization algorithm is completed, the values of "A" and "F" that are associated with the minimized value of the error function are used to identify the respective tone of the measured multi-tone signal associated with the respective trace points (step 307). In step 308, a logical comparison is made to determine whether all of the peak trace points have been processed. If not, the process flow returns to step 301 to process another peak trace point. If all have been processed, the process flow proceeds to step 309 where the process flow ends.

As previously discussed with respect to steps 303 and 304, the seed amplitude and the seed frequency are determined from the selected trace points. An exemplary implementation of steps 303 and 304 that processes the three trace points is shown in FIG. 4 as algorithm 400. The amplitudes (dB) and frequencies (Hz) of the three closest trace points to the peak are the input to algorithm 400. Using this input, algorithm 400 includes polynomial fitting operations and determines the seed amplitude and seed frequency. Algorithm 400 uses a $2^{nd}$ order polynomial fit and uses the maximum (or minimum) of the resulting curve defined by the derived polynomial to generate the seed amplitude and seed frequency. Algorithm 400 further provides "error traps" for corner cases.

In operation, algorithm 400 initially determines whether the middle trace point of the three trace points possesses the greatest amplitude and, if it does not, algorithm 400 returns the amplitude and frequency of the peak point that does possess the greatest amplitude as the seed values (line 401). The "curviness" (as defined by y1−2*y2+y3) of the three points is calculated in lines 402–404 utilizing the amplitude of the three trace points. If the "curviness" equals zero, the amplitude and frequency of the trace peak with the greatest amplitude are returned as the seed values (line 405). The polynomial fitting operations and evaluation of the derived polynomial occur in the evaluation of the expressions shown in lines 406–413 and the logical determinations are made in lines 414–415. Specifically, in line 414, if the value "Maximum" is not 1, then a maximum value was not found on the derived polynomial and the amplitude and frequency of the trace point associated with the greatest amplitude are returned as the seed values. In line 415, the evaluated variables "MinMaxX" and "MinMax Y" are returned as the seed values for the signal frequency (Hz) and amplitude (dB) respectively.

As previously discussed with respect to step 306, a minimization algorithm may be used to minimize the error between the "P" selected trace points and the predicted Fourier transform through a raised-cosine window length of T seconds of a theoretical tone of amplitude "A" with frequency "F." Representative embodiments use a sum of linear amplitude differences to implement the error function. Specifically, the error function may be defined by:

$$Err = \sum_{p=1}^{P} |F(\omega_p) - M_p|,$$

where $$F(\omega_p) = \frac{A}{a} \frac{\sin(x)}{(x)} \left( \frac{(a-b)}{\left(1 - \frac{\pi^2}{x^2}\right)} + \frac{a}{\left(1 - \frac{x^2}{\pi^2}\right)} \right),$$

$M_p$ is the amplitude of the $p^{th}$ selected point in linear terms;
A is the "theoretical" tone amplitude in linear terms,
F is the frequency of the "theoretical" tone,
T is the window length,
the raised cosine window function is given by $$\frac{1}{T}\left(a + b\cos\left(\frac{2\pi t}{T}\right)\right)$$

for $-T/2 \leq t \leq T/2$, 0 otherwise, a is the first parameter value of the raised-cosine window function, b is the second parameter value of the raised-cosine window function, $$\omega_p = 2\pi\left(F_c + H\left(p - \frac{P+1}{2}\right) - F\right),$$

P is the number of selected trace points,
p is the index of the current trace point,
$F_c$ is the middle frequency of the trace points,
H is the analyzer span divided by (the number of points on the analyzer trace minus one), and $$x = \omega_p \frac{T}{2}.$$

Exceptions exist for the above error function that should be trapped during computational operations. Specifically, when x approaches zero, $F(\omega_p)$ approaches A. Also, when x approaches $\pm\lambda$, then $F(\omega_p)$ approaches Ab/2a. Furthermore, it is noted that the Hanning window is a special case of the raised cosine window where a=0.5 and b=0.5. When a Hanning window is used further mathematical simplifications of the are possible that enable improved execution speed.

It shall be appreciated that utilizing the sum of the modulus of the linear difference between the selected trace points and the predicted Fourier transform of the theoretical tone is advantageous. Specifically, utilizing the linear voltage terms applies a greater weight; to higher level points and a lower weight to lower level points. By doing so, the effect of trace points corrupted by noise may be reduced. The use of linear terms avoids repetitive logarithmic calculations. Also, the use of the square of the linear difference (as opposed to the modulus operator) to ensure that the difference is positive would apply too little weight to lower level points. The square of the linear difference presents a "U" shaped minimum which makes the minimization process more difficult than the minimization process associated with the "V" shaped minimum of the linear difference.

Additionally, the minimization algorithm may be optimized utilizing partial derivatives of the error function to cause the minimization algorithm to converge to the minimum values of "A", "F", and "T" more quickly. Partial derivatives 501–503 for the raised-cosine window are shown in FIG. 5. Due to the modulus operator, the partial derivatives are discontinuous at zero. To adapt to the discontinuity, the value $S_p$ is used in partial derivatives 501–503. The value $S_p$ is defined to equal 1 when $F(\omega_p) \geq M_p$ and to equal −1 when $F(\omega_p) < M_p$. In evaluating partial derivatives 501–503, there are special cases that should be trapped to avoid division by zero. Partial derivative 501 approaches $S_p$ when x approaches zero and $(b/a)*S_p/2$ when x approaches $\pm\lambda$. Partial derivatives 502 and 503 approach zero when x approaches zero. Partial derivatives 502 and 503 tend toward solution 504 when x approaches $\pm\lambda$.

To illustrate the relative accuracy of measurements of tones according to representative embodiments, a series of measurements were performed utilizing an Agilent 89600 series VSA using a variety of techniques. The measurements were performed using conventional Flattop Window techniques and conventional Hanning Window techniques. Further, the measurements were performed by employing a Hanning Window with a polynomial fit according to representative embodiments. Also, the measurements were performed by a Hanning Window with a polynomial fit and a minimization algorithm according to representative embodiments.

The measurements occurred by analyzing a 5 MHz CW signal with the 89600 VSA. In the first measurement for each respective technique, the VSA was synchronized to the same reference as the CW signal and the analyzer center frequency was set to equal the frequency of the CW signal to generate baseline values for accuracy of further measurements. Thereafter, the frequency of the analyzer center frequency was successively modified to deviate from the CW signal frequency. The amplitude and frequency errors were then determined. The results of the measurements are provided below in TABLES I–IV.

TABLE I

Flattop Window, signal at 5MHz, 201 analyzer points, Span 1kHz, RBW 30Hz, 5Hz between each trace point.

| Analyzer Center Frequency | Measured Peak Amplitude (dBm) | Measured Peak Amplitude Error (dBm) | Measured Peak Frequency (Hz) | Measured Peak Frequency Error (Hz) |
|---|---|---|---|---|
| 5.000000 MHz | 3.976 | 0 | 5000000 | 0 |
| 5.000001 MHz | 3.978 | +0.002 | 5000001 | +1 |
| 5.000002 MHz | 3.982 | +0.006 | 4999997 | −3 |
| 5.000003 MHz | 3.982 | +0.006 | 5000003 | +3 |
| 5.000004 MHz | 3.978 | +0.002 | 4999999 | −1 |
| 5.000005 MHz | 3.976 | 0 | 5000000 | 0 |

TABLE II

Hanning Window, signal at 5MHz, 51 analyzer points, Span 1kHz, RBW 30Hz, 20 Hz between each analyzer trace point. Trace data examined using simple "Marker to Peak" and "Marker read" functions.

| Analyzer Center Frequency | Measured Peak Amplitude (dBm) | Measured Peak Amplitude Error (dBm) | Measured Peak Frequency (Hz) | Measured Peak Frequency Error (Hz) |
|---|---|---|---|---|
| 5.000000 MHz | 3.979 | 0 | 5000000 | 0 |
| 5.000005 MHz | 3.627 | −0.352 | 5000005 | +5 |
| 5.000010 MHz | 2.554 | −1.425 | 5000010 | +10 |

TABLE III

Hanning Window, signal at 5MHz, 51 analyzer points, Span 1kHz, RBW 30Hz, 20Hz between each analyzer trace point. Trace points processed using a 3-point $2^{nd}$ order polynomial fit to the closest three points to the signal peak where the polynomial fit is solved for peak maximum according to representative embodiments.

| Analyzer Center Frequency | Measured Peak Amplitude (dBm) | Measured Peak Amplitude Error (dBm) | Measured Peak Frequency (Hz) | Measured Peak Frequency Error (Hz) |
|---|---|---|---|---|
| 5.000000 MHz | 3.979 | 0 | 5000000 | 0 |
| 5.000005 MHz | 4.067 | +0.088 | 4999999.7 | −0.3 |
| 5.000010 MHz | 4.301 | +0.322 | 5000000 | 0 |

TABLE IV

Hanning Window, signal at 5MHz, 51 analyzer points, Span 1kHz, RBW 30Hz, 20Hz between each analyzer trace point. Trace points processed utilizing a polynomial fit algorithm and an error minimization algorithm according to representative embodiments.

| Analyzer Center Frequency | Measured Peak Amplitude (dBm) | Measured Peak Amplitude Error (dBm) | Measured Peak Frequency (Hz) | Measured Peak Frequency Error (Hz) |
|---|---|---|---|---|
| 5.000000 MHz | 3.979 | 0 | 5000000.000 | 0 |
| 5.000005 MHz | 3.979 | 0 | 5000000.001 | +0.001 |
| 5.000010 MHz | 3.978 | −0.001 | 5000000.000 | 0 |

Accordingly, representative embodiments provide increased amplitude accuracy over Flattop and unprocessed Hanning window types. Specifically, amplitude accuracy of 0.001 dB has been empirically demonstrated according to representative embodiments, whereas unprocessed Flattop and Hanning window traces incur up to 0.006 dB and 1.425 dB errors. In terms of frequency, from these empirical results, it would appear that accuracy of the order of RBW/30000 may be achieved. The observed degree of the accuracy of frequency measurements according to representative embodiments may depend upon a number of factors. For example, the SNR of the signal being analyzed may affect the frequency accuracy. Also, if another tone is relatively close (i.e., within 3 RBW), the frequency accuracy may also be affected.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the sane function or achieve substantially the same result as the corresponding embodiments described herein may be used according to the present invention. Accordingly, the appended claims are intended to include within their scope such processes, machines, manufacture, compositions of matter, means, methods, or steps.

What is claimed is:

1. A method for analyzing a signal, comprising:
   for a peak identified in a frequency representation of said signal, identifying a plurality of points in said frequency representation closest to said peak; and
   determining a tone frequency and a tone amplitude of said signal utilizing a minimization algorithm, wherein said minimization algorithm minimizes an error function that measures a difference between (i) a windowed frequency representation of a tone at a given frequency and a given amplitude and (ii) said plurality of points.

2. The method of claim 1 further comprising:
   determining a seed amplitude, a seed frequency, and a seed window length utilizing said plurality of points.

3. The method of claim 2 wherein said determining a seed amplitude, a seed frequency, and a seed window length uses a polynomial fitting algorithm to derive a polynomial fitted to said plurality of points.

4. The method of claim 3 wherein said determining a seed amplitude, a seed frequency, and a seed window length uses a maximum value of said derived polynomial to generate said seed amplitude and said seed frequency.

5. The method of claim 1, wherein said minimization algorithm is initialized utilizing said seed amplitude, seed frequency, and said seed window length.

6. The method of claim 1 wherein said error function is a summation of the absolute value linear difference between an amplitude of one of said plurality of points and an amplitude of said windowed frequency representation evaluated at a frequency of said one of said plurality of points, wherein the summation occurs over each of said plurality of points.

7. The method of claim 1 wherein said windowed frequency representation uses a raised-cosine window to window said tone at a given frequency and a given amplitude.

8. The method of claim 1 wherein said windowed frequency representation uses a Hanning window to window said tone at a given frequency and a given amplitude.

9. The method of claim 1 wherein said signal is a multi-tone signal and further comprising:
   identifying a plurality of peaks in said frequency representation of said multi-tone signal; and
   repeating said identifying a plurality of points and determining a tone frequency and a tone amplitude for each of said plurality of peaks.

10. A computer readable medium that includes executable instructions for processing trace data points of a multi-tone signal, said computer readable medium comprising:
    code for receiving said trace data points, wherein said trace data points are associated with a plurality of peaks;
    code for selecting, for one of said plurality of peaks, a plurality of points in said trace data points closest to said one of said plurality of peaks;
    code for calculating a tone frequency and a tone amplitude of said multi-tone signal utilizing a minimization algorithm, wherein said minimization algorithm minimizes an error function that measures a difference between (i) a windowed frequency representation of a tone at a given frequency and a given amplitude and (ii) said plurality of points; and
    code for controlling said code for selecting and calculating to perform said selecting and calculating for each of said plurality of peaks.

11. The computer readable medium of claim 10 further comprising:
    code for determining a seed amplitude, a seed frequency, and a seed window length utilizing said plurality of points.

12. The computer readable medium of claim 11, wherein said minimization algorithm is initialized utilizing said seed amplitude, seed frequency, and said seed window length.

13. The computer readable medium of claim 11 wherein said code for determining a seed amplitude, a seed frequency, and a seed window length uses a polynomial fitting algorithm to derive a polynomial fitted to said plurality of points.

14. The computer readable medium of claim 11 wherein said error function is a summation over each of said plurality of points of the modulus of the difference between (i) an amplitude of one of said plurality of points and (ii) an amplitude of said windowed frequency representation evaluated at the same frequency as a frequency of said one of said plurality of points.

15. The computer readable medium of claim 10 wherein said windowed frequency representation is calculated utilizing a raised-cosine window.

16. A system for analyzing a multi-tone signal, comprising:

means for analyzing said multi-tone signal to generate a plurality of trace points;

means for identifying a plurality of trace peaks in said plurality of trace points; and means for calculating a tone frequency and a tone amplitude of said multitone signal for each of said plurality of trace peaks utilizing a minimization algorithm, wherein said minimization algorithm minimizes an error function that measures a difference between (i) a windowed frequency representation of a tone at a given frequency and a given amplitude and (ii) a plurality of points that surrounds a respective one of said plurality of trace peaks.

17. The system of claim 16 wherein said means for minimizing performs a summation over each of said plurality of points of the modulus of the difference between (i) an amplitude of one of said plurality of points and (ii) an amplitude of said windowed frequency representation evaluated at the same frequency as a frequency of said one of said plurality of points.

18. The system of claim 16 further comprising:

means for generating seed values for said minimization algorithm.

19. The system of claim 16 wherein said means for calculating uses a raised-cosine window function.

20. The system of claim 16 wherein said means for calculating uses a Hanning window function.

* * * * *